United States Patent [19]
Suzuki

[11] 3,947,895
[45] Mar. 30, 1976

[54] MAGNETIC TAPE RECORDER

[75] Inventor: Shoji Suzuki, Iwaki, Japan

[73] Assignee: Alps Motorola, Inc., Tokyo, Japan

[22] Filed: Jan. 16, 1975

[21] Appl. No.: 541,429

[30] Foreign Application Priority Data
Feb. 27, 1974   Japan............................ 49-23645[U]

[52] U.S. Cl............................ 360/137; 242/55.19 A
[51] Int. Cl.²..................... G11B 15/24; B65H 17/48
[58] Field of Search.............. 360/137; 242/55.19 A; 274/42 R, 4 R

[56] References Cited
UNITED STATES PATENTS
3,603,743   9/1971   Ban............................ 242/55.19 A
3,765,685   10/1973   Harlan et al. ........................ 360/137

*Primary Examiner*—Daryl W. Cook
*Attorney, Agent, or Firm*—James W. Gillman; Donald J. Lisa

[57] ABSTRACT

The function control levers of a magnetic tape recorder are selectively locked into place by a locking lever which is movable transversely to the direction of movement of the control levers. A stop lever which moves in parallel to the direction of movement of the other function control levers includes a cam engaging projection thereon for engaging a cam surface on the locking lever to effect release of the locking lever from a previously locked control lever to stop the operation of the tape recorder with which the apparatus is employed. A pivoted cam is mounted on the stop lever and whenever a function control lever is locked into place, the pivoted end is pushed out of engagement with a cartridge ejection lever by a projection on the locking lever. When the locking lever releases, the cam is placed in position to engage the cartridge ejection lever; so that a second depression of the stop function lever operates through the cam to eject a cartridge or cassette in the recorder.

7 Claims, 2 Drawing Figures

MAGNETIC TAPE RECORDER

BACKGROUND OF THE INVENTION

This invention relates generally to magnetic tape recorders, and more particularly to an improvement in which the stop lever serves a dual function to operate the cartridge or cassette ejection lever.

In cassette or cartridge magnetic tape recorders a number of function control levers are employed to determine the mode of operation of the recorder. For example, depression of one function control lever operates to place the recorder in its record mode of operation. A similar operation of a different function lever operates to place the recorder in its play-back mode of operation, etc. In addition, most such recorders also include a "stop" function lever which, when it is depressed, releases all previously depressed function levers and returns the recorder to a standby or stop mode of operation.

In addition to the function control levers for controlling the mode of operation of the recorder, there generally also is provided an additional user-operated ejection lever for ejecting the cassette or cartridge from the tape recorder. Requirement for a separately operated ejection lever, however, results in a more complex construction and causes such recorders to be less economical to manufacture than would be the case if no separate ejection lever were required.

It is desirable to construct a magnetic tape recorder in such a manner as to use one of the function control levers to perform a dual function of effecting a selected control and also to operate to eject a cartridge or cassette from the recorder when desired.

SUMMARY OF THE INVENTION

Accordingly, it is an object of this invention to provide an improved tape recorder.

It is an additional object of this invention to provide an improved magnetic tape recorder in which one function control lever performs a dual function for additionally operating to effect ejection of a cassette or cartridge from the recorder.

It is an additional object of this invention to provide an improved magnetic tape recorder which is simple in operation and economical to manufacture.

It is a further object of this invention to utilize the stop function control lever of a magnetic tape recorder in conjunction with a locking plate and a cam arrangement to perform the dual functions of controlling the stopping of the operation of the recorder and ejection of a cartridge or cassette from the recorder when desired.

In accordance with the preferred embodiment of this invention, several function control levers are employed in a magnetic tape recorder in conjunction with a locking plate which is movable transversely across them for controlling the operation of the recorder. Whenever any one of the function control levers is depressed, a projection on it engages a cam surface on the locking plate to move the locking plate across the function plate to a position where the function control lever falls into a notch on the locking plate to hold the recorder in the selected mode of operation. A stop function control lever has a cam member pivotally mounted on it, and a projection on the locking plate which extends in a different plane from the plane of the locking plate engages the cam member to rotate it from a first position to a second position when the locking plate is displaced from a first position to a second position by operation of one of the other function control levers. Subsequent depression of the stop lever then causes the locking plate to release a previously locked function control lever and return to its first position whereupon the cam member also rotates back to its first position. In this condition, a second depression of the stop lever causes the cam member to engage an ejection lever for ejecting a cassette or cartridge from the tape recorder. The cam member in its second position cannot engage the ejection lever; so that ejection of a cartridge or cassette takes place only upon two consecutive operations of the stop lever.

DETAILED DESCRIPTION

In the following description, the words "tape recorder" are intended to cover tape players and recorder/players as well as tape recorders.

Figure 1:
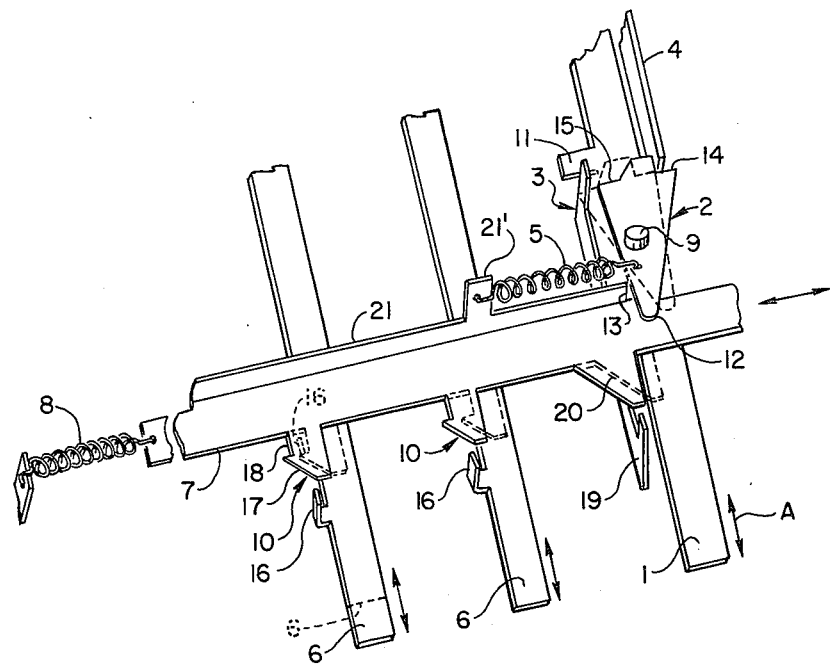
FIG. 1 is a perspective view of a portion of a tape recorder using an embodiment of the present invention; and, FIG. 2 is a perspective view of a similar portion of a tape recorder using another embodiment of the invention.

Referring now to FIG. 1, showing a first embodiment of the present invention, there is provided a combination stop and ejection lever 1 slidably attached to a structural frame (not shown) of a switching (or control) mechanism in a tape recorder. The lever 1 is used to control the stopping of the recording or reproducing operation of the tape recorder and also to control ejection of the cassettes or the like out of the tape recorder. A cam member 2 of a substantially triangular configuration is pivotally supported on the lever 1 through a pivot pin 9 for selective engagement with a driving member 3 having two end portions 19 projecting laterally upwardly in the plane of the member 3. The driving member 3 is slidably attached to the structural frame of the switching mechanism in a suitable manner (not shown) for movement in the same direction (arrow A) as the lever 1.

An ejection lever 4 also is located for selective engagement with the cam member 2 to eject the cassette or the like out of the tape recorder. Other function control levers 6 are disposed in parallel to the lever 1 and are used to control the mode of operation of the tape recorder, such as recording, reproducing, fast feeding of the tape, etc. A locking plate 7 extends transversely across all of the levers 1 and 6 and is normally urged to the left (as viewed in FIG. 1) by means of a spring 8 attached to the frame. The plate 7 carries cam extensions 10, each comprising an oblique surface 17 and a notch 18, at positions opposing corresponding upright projections 16 on the levers 6. Another oblique surface 20 without a notch is located on the plate 7 at a position opposing an end 19 of the driving member 3.

The locking plate 7 has the edge opposite the cam surfaces 10 and 20 bent upwardly to form a projection 21, an end 13 of which is caused to abut against an end 12 of the cam member 2 when the cam member 2 is rotated around the pivot pin 9 under the action of a spring 5 extended between a tab 21' on the projection 21 of the locking plate 7 and the cam member 2.

The tape recorder of the above described construction operates as follows:

In FIG. 1, the example of the tape recorder is indicated in the nonoperative state, wherein a shoulder portion 14 of the cam member 2 pivotally mounted on the lever 1 engages the lower end (as viewed in FIG. 1) of the cassette ejection lever 4. Assume now that a cassette is inserted into the tape recorder. Then the desired one of the function control levers 6 is depressed (moved upward in FIG. 1) so that the projection 16 thereof abuts against the oblique surface 17 of a cam extension 10 aligned with the depressed lever 6. This shifts the locking plate 7 rightwardly against the force of the spring 8 until the projection 16 of the lever 6 falls into the notch 18 formed in the cam extension 10. As a result, the lever 6 is locked to the depressed position (as shown by broken line 6') for placing the tape recorder in the desired operating state.

Furthermore, since the locking plate 7 has been shifted rightwardly to the position indicated by broken lines after the depression of a lever 6, the cam member 2, is rotated counter-clockwise around the pivot pin 9 by the end 13 of the projection 21 to a position, also indicated by broken lines, where the cassette ejection lever 4 is disengaged from the shoulder 14 of the cam member 2, while the shoulder 15 of the cam member 2 abuts against one of the projecting ends 19 of the driving member 3.

When it is desired to stop the selected function or operation of the tape recorder, the lever 1 is depressed (upwardly as viewed in FIG. 1). Upon depression of the lever 1, the shoulder 15 of the cam member 2 mounted on the lever 1 shifts the driving member 3 in the same direction as the lever 1 is depressed. Thus the other projecting end 19 of the driving member 3 abuts against the oblique surface 20 of the locking plate 7 to shift the locking plate 7 further to the right. As a result, the projection 16 of the lever 6 which was locked in a notch 18 is released from the notch 18 and automatically returns to its original position under the action of a retracting spring (not shown) thereby stopping the previously selected function or operating mode of the tape recorder.

When the depressing force of the lever 1 is released, the lever 1 is retracted to its original position under the action of retracting spring (not shown), and the driving member 3 is also retracted to the original position under the action of the projecting portion 11 of the lever 1, which now abuts against the upper projecting end of the driving member 3. After retraction of the lever 1, the locking plate 7 is also retracted to the original position indicated by full lines, and the cam member 2 is retracted from the position indicated by broken lines to the position indicated by the full lines, where the shoulder 14 of the cam member 2 is opposite the end of the cassette ejection lever 4.

If the lever 1 is again depressed in this state, the shoulder 14 of the cam member 2 now abuts against the ejection lever 4, and the cassette is ejected from the tape recorder under the operation of a cassette ejection mechanism (not shown). Furthermore, the driving member 3 for the locking plate 7 is not shifted by this second depression of the lever 1 so that the locking plate 7 is held in its retracted position; and the shoulder 14 of the cam member 2 remains in engagement with the cassette ejection lever 4.

When the lever 1 is again released after ejection of the cassette, the lever 1 and the cassette ejection lever 4 are retracted to their original positions (by return springs, not shown). Thus, the stopping of the recording or reproducing operation of the tape recorder and the ejection of the cassette can be effected by a single lever.

Figure 2:
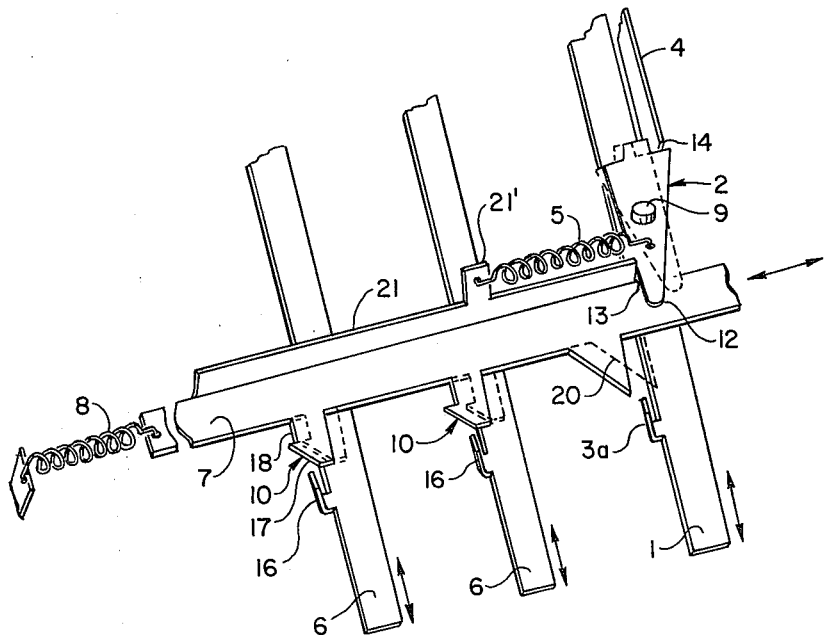

In FIG. 2, there is indicated another example of the switching mechanism in a tape recorder according to a second embodiment of the present invention. In this example, a driving member projection 3a corresponding to the driving member 3 in the above described example is now provided integrally with the lever 1. The driving member projection 3a engages the oblique surface 20 of the locking plate 7 when any one of the control levers 6 is depressed; but the projection 3a passes freely to the right of the extension with the surface 20 when none of the control levers 6 is depressed. Furthermore, only a single shoulder 14 is provided for the cam member 2, and the shoulder 14 is engaged and disengaged with the cassette ejection lever 4. The arrangements and constructions of other members are quite similar to those described in the previous example.

In operation of the apparatus of FIG. 2, if a lever 6 for recording or reproducing is depressed, the lever 6 is locked to the depressed position when the locking plate 7 is shifted rightwardly under the action of the projection 16 of the lever 6. This rightward displacement of the locking plate 7 brings the oblique surface 20 thereof to a position which is opposite the driving member 3a, while the end 13 of the projection 21 of the locking plate 7 causes the cam member 2 to rotate to the dotted position thereby placing the shoulder 14 of the cam member 2 out of alignment with the cassette ejection lever 4.

Then if the lever 1 is depressed for stopping the operation of the tape recorder, the driving member 3a formed as an integral part of the lever 1, shifts the locking plate 7 further to the right, releasing the previously depressed lever 6 to its original position. When the lever 1 is then released, the plate 7 is pulled to the left by the spring 8. Then when the lever 1 is again depressed, the driving member 3a passes to the right of extension 20 and the shoulder 14 of the cam member 2 causes the cassette ejection lever 4 to be shifted (upwardly as viewed in FIG. 2) to eject the cassette or the like.

The cam member 2 is pivotally mounted on the lever 1 which is operable for stopping the operation of the tape recorder and for ejecting the cassette or the like from the tape recorder. The spring 5 provided between the cam member 2 and the tab 21' causes the cam member 2 to abut against the end 13 of the projection 21, so that the entire switching mechanism can be of a simple construction. In addition, since the cam member 2 is mounted on the lever 1, its attachment can be achieved in a compact manner, minimizing the size of the tape recorder. In addition, since a single lever 1 is used both to stop the operation of the tape recorder and to eject the cassette or the like from the tape recorder, the operation of the tape recorder is much simplified.

I claim:

1. In a tape recorder having a plurality of function control levers associated with a locking plate used for controlling the operation of a tape recorder, an improvement including in combination:

a cam member pivotally mounted on one of said control levers;

a projection on said locking plate extending in a different plane from the plane of said locking plate;

spring means interconnecting said cam member and said locking plate, urging the cam member into abutment with the projection on said locking plate thereby to rotate the cam member from a first position to a second position with the locking plate being displaced from a first position to a second position; and means operated by said cam member for ejecting a cassette from the tape recorder when said one control lever is moved from a first to a second position thereof with said locking plate in the first position thereof.

2. The combination according to claim 1 further including a driving member for moving said locking plate from the second position thereof to a third position, wherein said locking plate has a cam extension thereon with a cam surface for engagement by a projection on another one of said plurality of control levers such that when said another control lever is moved from a first position to a second position, the projection thereon engages the cam surface on the extension of said locking plate to cause said locking plate to be shifted from its first position to the second position thereof, locking said another control lever in its second position and causing the cam member to rotate to its second position to disengage said cam member from said cassette ejecting means; so that upon subsequent movement of said one control lever from the first position to the second position thereof, such control lever causes said driving member to shift the locking plate to the third position thereof, whereby said another control lever is released and the operation of the tape recorder is thereby stopped.

3. The combination according to claim 2 wherein said driving member is a separate member having laterally extending ends, one of which is engageable with said cam member and the other of which is operable to shift said locking plate to said third position thereof.

4. The combination according to claim 2 wherein said driving member is formed as an integral part of said one control lever.

5. The combination according to claim 2 further including a second spring means coupled to said locking plate for retracting said locking plate to the first position thereof upon movement of said one control lever from the second position thereof to the first position thereof.

6. The combination according to claim 5 wherein the projection on said locking plate is located so that when said locking plate is returned to the first position thereof, said cam member is rotated under the action of said first spring means to the first position thereof with a portion of the cam member engaging said cassette ejecting means.

7. The combination according to claim 6 wherein the relative arrangement of the parts of said locking plate and said driving member is such that said driving member does not move said locking plate to the third position thereof when said locking plate is in its first position upon movement of said one control lever from the first position to the second position thereof, so that said cassette ejecting means is engaged by said cam member when said one control lever is so moved to eject a cassette from the tape recorder.

* * * * *